Feb. 15, 1966 R. S. HANSON 3,234,783
METHOD AND APPARATUS FOR FATIGUE TESTING MATERIALS
Filed Sept. 13, 1960 2 Sheets-Sheet 1

INVENTOR.
Roger S. Hanson
BY
Hugh L. Fisher
ATTORNEY

Feb. 15, 1966 R. S. HANSON 3,234,783
METHOD AND APPARATUS FOR FATIGUE TESTING MATERIALS
Filed Sept. 13, 1960 2 Sheets-Sheet 2

INVENTOR.
Roger S. Hanson
BY
Hugh L. Fisher
ATTORNEY

United States Patent Office 3,234,783
Patented Feb. 15, 1966

3,234,783
METHOD AND APPARATUS FOR FATIGUE
TESTING MATERIALS
Roger S. Hanson, Warren, Mich., assignor to General
Motors Corporation, Detroit, Mich., a corporation of
Delaware
Filed Sept. 13, 1960, Ser. No. 55,665
14 Claims. (Cl. 73—100)

This invention relates to a method and apparatus for fatigue testing materials.

Because of the constant demand for lighter and smaller power equipment, the designer must carefully stress analyze all of the various elements of a mechanism and particularly those parts subjected to varying stresses induced by constantly reversing loads. These reversing load stresses, commonly called fatigue stresses or endurance limits, must necessarily be accurately determined, rather than assume that they are between 40% and 50% of the ultimate strength of the material, as is often done. One method commonly used for determining these fatigue stresses is to rotatably support a round constant cross-section specimen near the ends and suspend a predetermined weight from the medial portion thereof. The specimen is then rotated so that the outer fibers of the specimen are alternately placed in compression and tension during each revolution or cycle, and the number of cycles required to produce a specimen rupture are counted. The stress can be determined by this method relatively accurately but not exactly because the structure is one that is known as statically indeterminate due to the inability to forecast the exact reactions at the supports. Consequently, the fiber stress is still an approximation and the machine designer must employ a factor of safety adequate to cover this approximation.

Also, with the apparatus just described, and particularly when the specimen is of a very strong material, it is necessary to employ a very large weight, which requires that the apparatus be relatively large and that the supports be adequate for the increased weight. Moreover, the cross-section of these tough specimens must be reduced so that together with the large weight, a rupture can be induced in order to determine the endurance limit of the material. The use of a specimen with a small cross-section tends to introduce errors into the results because variations occur between what appears to be identical specimens. This is partially attributed to the fact that a small cross-sectional area is not as homogenous as a larger area.

Another concern with the foregoing apparatus is that it tends to be noisy and this can be objectionable in some types of laboratories.

Accordingly, the invention contemplates a mode of increasing substantially the bending moments to which specimens being fatigue tested are subjected without increasing the applied weight. Somewhat more specifically stated, the invention seeks to provide a method of fatigue testing wherein the test specimen is revolved simultaneously about two different axes so that gyroscopic effects can be utilized to increase or decrease the weight induced moments acting on the specimens. Another aim of the invention is to afford fatigue testing apparatus that incorporates the gyroscopic principle so as to supplement a weight induced bending moment and thereby substantially increase the total bending moment applied to a specimen without increasing the applied weight. With this apparatus, the specimen size can be increased so as to present a more homogenous cross-section and accordingly produce more uniform results between identical specimens. Also, the apparatus can be relatively small in size and caused to operate more quietly and efficiently.

By the invention, the fatigue testing apparatus is arranged to revolve a specimen on which a disk-like weight is overhung about one axis thereof. Simultaneously, the specimen and the weight are rotated about a transverse axis so that the specimen is subjected to a combined weight induced and gyroscopic produced moment.

The foregoing and other objects and advantages of the invention will be apparent from the following description and from the accompanying drawings in which.

Figure 1:
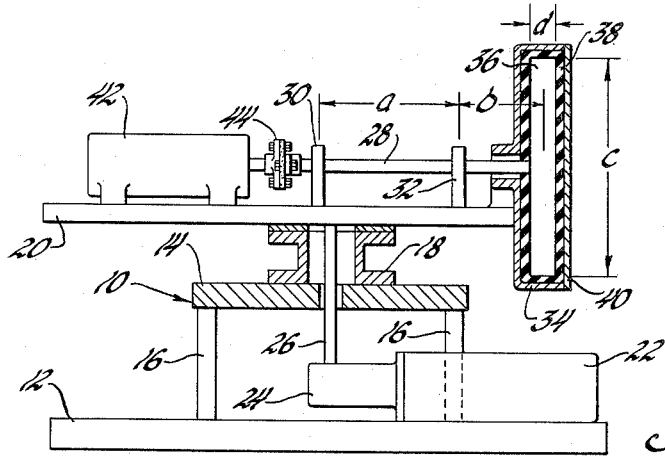
FIGURE 1 depicts fatigue testing apparatus incorporating the principles of the invention.

Considering now the drawings in detail and particularly FIGURE 1, the numeral 10 denotes generally an apparatus base of the pedestal type. The base 10 has a bottom plate 12 and an upper splate 14 separated by pillars 16. At the top and attached to the upper plate 14 is a column 18.

Continuing to refer to FIGURE 1, a platform 20 is rotatably positioned on the column 18 and is revolved by a variable speed motor 22 mounted on the base bottom plate 12 through the agency of speed ratio varying mechanism as gearing 24 and a vertical or precession shaft 26. The speed of the motor 22 preferably can be altered and/or the ratio from gearing 24 in any known way so that the precession shaft 26 and, accordingly, the platform 20 can be revolved at different speeds for reasons to become apparent.

An elongated round specimen 28 is rotatably journaled on the platform 20 by supports 30 and 32 so that the rotational axis thereof is mutually perpendicular to the rotational axis of the precession shaft 26. The rightmost end of the specimen 28 extends into a flywheel housing 34 suitably joined to the platform 20 and is connected to an overhung disk 36 of some predetermined weight. Preferably, the housing 34 is lined with a resilient material, such as rubber, and is enclosed by a cover 40. The other end of the specimen 28 is coupled to a constant speed motor 42 mounted on the platform 20, the drive connection being made through a resilient coupling 44 so that drive line shocks are not transferred to the motor 42. If desired, this motor 42 can be also made a variable speed motor as the motor 22, employed to drive the precession shaft 26.

With the arrangement as illustrated, when the specimen 28 is revolved by the constant speed motor 42, the disk 36 will likewise be revolved, and as a result, the downwardly acting weight from the disk 36 will cause the outer fibers of the specimen 28 to be alternately placed in compression and tension thereby simulating the reversed loading taking place in a machine.

It should be mentioned at this point the reason for having the disk 36 overhung or at the end of the specimen 28. As will become apparent, this location of the weight enables the moment between the closest support 32 and the disk 36 to be accurately determined irrespective of any restraining moments inadvertently induced by the supports 30 and 32. The moment with this location of the disk 36 will be simply the product of the weight of the disk 36 and the distance $b$ from the disk 36 to the support 32 ($M=Wb$). Hence, the reactions at either of the supports 30 or 32 do not enter into the determination, and an accurately ascertained moment, necessary to calculate the fiber stress, S, is easily determined as follows:

$$S = \frac{\text{Moment (specimen radius)}}{\text{Second moment of the specimen cross-sectional area with respect to neutral or rotational axis}}$$

Figure 3:
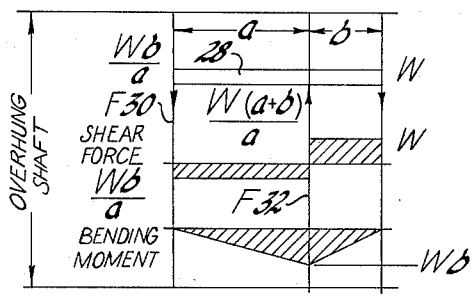

The preceding is further demonstrated by the FIGURE 3 diagrams for, as is known from Statics, the sum of the forces acting on the specimen 28 in the directions indicated must equal zero. For example:

$$-F_{30} + F_{32} - W = 0$$

where $F_{30}$ = the force at support 30

$F_{32}$ = the force at support 32 and $W$ = the weight of the disk 36

Also, the sum of the moments about support 32 = 0; and hence, $$Wb - F_{30}a = 0$$

The moments about the support 30 result in the equation:

$$W(a+b) - F_{32}a = 0$$

Therefore:

$$F_{30} = \frac{Wb}{a} \text{ and } F_{32} = \frac{W(a+b)}{a}$$

By substituting actual values, mentioned later, the diagrams of FIGURE 3 can be accurately plotted and, as can be seen, the maximum moment is $Wb$.

The possibility of errors entering into the determination of the moment used to ascertain fiber stress can be exemplified by examination of the just determined value $F_{30}$ and the moment about this point, for each is statically indeterminate. To explain further, supposing that the axis of the specimen 28 is slightly inclined at the support 30. Obviously, the force $F_{30}$ would not be vertical as depicted in FIGURE 3, but also inclined. This inclination, of course, is very difficult to measure accurately and usually not only varies as the specimen rotates but also changes with the number of cycles of alternate compressing and tensioning of the specimen fibers. Stated somewhat differently, the supports 30 and 32 can induce into the determination of moments errors that cannot be predicted accurately. If the disk 36 were mounted between the supports 30 and 32, the problem of statically into the determination of moments errors that cannot accurate calculation of the moment, as is possible with the overhung disk 36, could never be assured.

During actual tests, ruptures have always occurred between the support 32 and the disk 36 further demonstrating that there is no ambiguity in the determination of this moment, such as could be induced by some unpredictable force. If the rupture had occurred between the supports 30 and 32, then it would be known that there was some unknown reaction.

Figure 7:
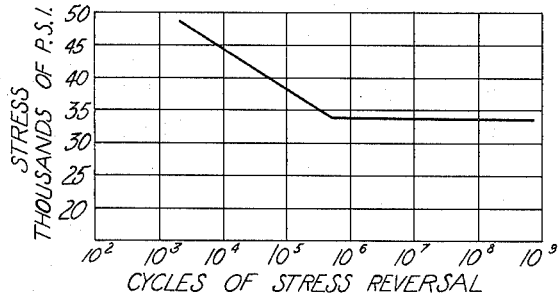
FIGURE 7 is an S–N graph relating stress and the number of cycles of stress reversal.

With the FIGURE 1 apparatus and assuming that the specimen 28 is being revolved only about its rotational axis by the motor 42, a diagram such as that in FIGURE 7 can be obtained. The stress determined from the fiber stress equation can be varied by altering the weight of the disk so that as the test progresses, it will be found that the specimen generally ruptures after so many cycles and at a certain stress. This stress is identified by the straight line occurring at approximately 34,000 p.s.i. This, then, will be the endurance limit of the material of which the specimen is composed.

With this background, suppose that the specimen is made of a very strong and durable material and that it does not rupture although subjected to the maximum stress the apparatus is capable of applying. If this condition exists, usually only one of two alternatives is available. The diameter of the specimen can be reduced and this is undesirable since the smaller cross-sectional area is less homogenous and actual tests show a wide variety of results from what appears to be otherwise identical specimens. (Ideally, the cross-sectional area of the specimen should be as great as possible so as to reduce this error.) If the other alternative is accepted, then the apparatus presumably must be made larger to accommodate a greater weight. The larger equipment consumes additional space, and the increased bearing loads from the added weight must also be considered.

Figure 8:
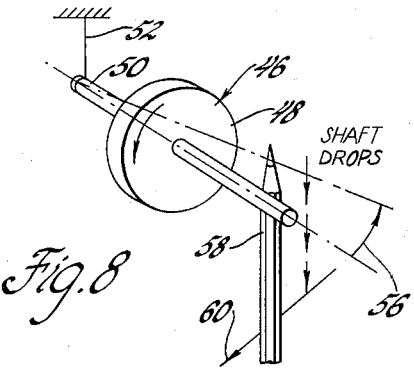
FIGURES 8 and 9 show simple gyros used to demonstrate the gyroscopic principle employed by the invention.
Figure 9:
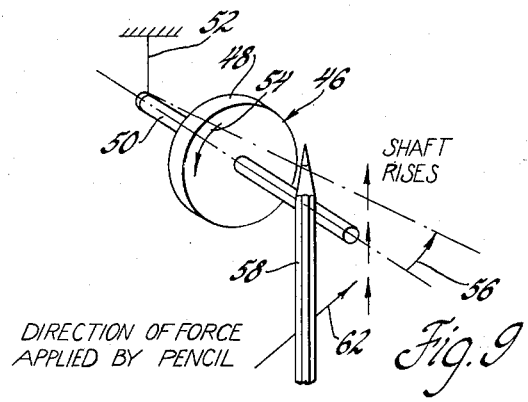

Obviously, it is desirable to avoid either of these alternatives and this can be done by causing the platform 20 to be revolved by the variable speed motor 22. By revolving the platform 20, a gyroscopic effect results and can be utilized to supplement the bending moment from the weight of the disk 36. To understand this gyroscopic effect, it should be kept in mind while referring to FIGURES 8 and 9 that by definition, a gyroscope is a rigid body that rotates with a relatively high angular velocity about a given axis, called the axis of rotation, while it rotates or tends to rotate about a second mutually perpendicular axis with a relatively low angular velocity while subjected to a moment acting about a third mutually perpendicular axis. As shown in these figures for demonstration purposes, a simple gyro 46 comprising a disk 48 and a shaft 50 is supported by a vertical cord 52. The axis of rotation mentioned in the definition is represented by the axis of shaft 50, rotation being in the direction of the arrow 54. The second axis is the precession axis defined by the vertical cord 52 and the rotation is assumed to be in the direction of arrow 56. If now, in FIGURE 8 a pencil 58 is urged against the end of the shaft 50 in the displayed manner and in the direction of arrow 60, the shaft 50 will drop along the third axis called the moment axis. The resultant moment will be in addition to that from the weight of the disk 48. If, on the other hand, the force supplied by the pencil is in the direction of arrow 62 in FIGURE 9, the shaft 50 will rise, this rise and fall of the shaft 50 being basic to the gyroscopic principle whenever an attempt is made to change the direction of the axis about which a rigid body is spinning. Therefore, it can be seen that the moment of the weight can be increased or decreased by the gyroscopic moment and that the moment can be caused to act vertically upwardly or downwardly.

Using this principle demonstrated by the simple gyro 46 and considering the restraint on the specimen 28 offered by the supports 30 and 32 as analogous to that from pencil 58, it is now apparent that by rotating the table 20 in the proper direction, a downwardly acting moment can be induced by the gyroscopic effect and that this gyroscopic moment ($M_g$) acts in the same direction as the weight induced moment.

Figure 2:
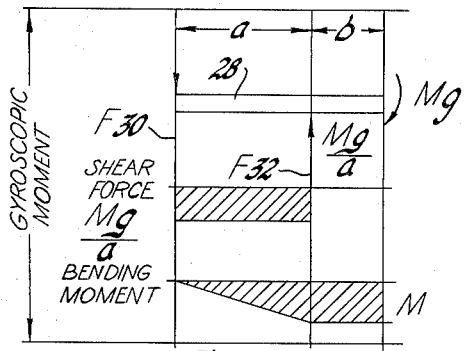
FIGURES 2, 3 and 4 show shear force and bending moment diagrams of a specimen tested by the FIGURE 1 apparatus.

Keeping in mind that the gyroscopic moment ($M_g$) is equal to the product of the mass moment of inertia of the disk 36 about its axis of symmetry and of both the angular velocity of the rotating specimen 28 and the angular velocity of the precession shaft 26, the force and bending moment diagrams in FIGURE 2 can be plotted by substituting the appropriate values. The force due to the gyroscopic moment acting at either the supports 30 and 32 will be $$\frac{M_g}{a}$$

since the moment $M_g$ is equal to the applied force times the distance $a$ in each instance.

Figure 4:
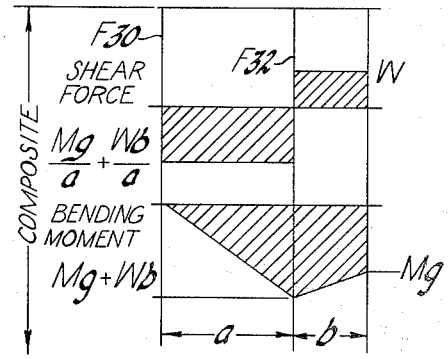

The significance of the shear force and bending moment diagram of FIGURE 4 can be appreciated since these diagrams are a composite of the FIGURE 2 and FIGURE 3 diagrams. As explained, the total moment is the sum of both the gyroscopic moment and the moment produced by the overhung weight 36 and is substantially larger than the bending moment from the disk 36 alone.

At this point, values are suggested for substitution in the fiber stress formula and for the shear force and bending moment diagrams as follows:

| | | |
|---|---|---|
| Specimen speed | r.p.m. | 1800 |
| Specimen diameter | inch | ½ |
| Weight of disk 36 | lbs. | 31.7 |
| Distance a | inches | 4 |
| Distance b | do | 2 |
| Radius of disk 36 | do | 6 |

Figure 6:
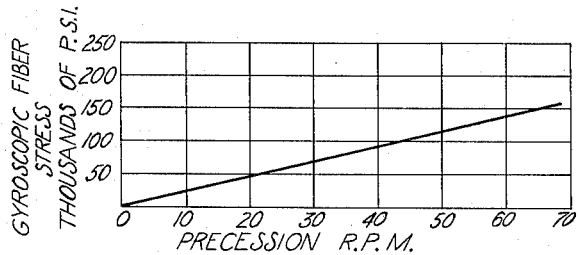
FIGURE 6 is a graph demonstrating the relation between gyroscopic fiber stress and precession speed.

Then, the fiber stress $S=2380$ (precession shaft r.p.m.) lbs./in.$^2$. Merely by increasing the precession shaft r.p.m., the gyroscopic fiber stress can be increased substantially as viewed in the FIGURE 6 graph. As a further comparison, reference is made to FIGURE 7 where the maximum fiber stress is approximately 50,000 p.s.i. whereas, as displayed in FIGURE 6, the maximum fiber stress at 70 r.p.m. of the precession shaft 26 is over 150,000 p.s.i. In actual practice, the gyroscopic fiber stress can be increased many times that obtainable with the weight induced bending moment alone.

Figure 5:
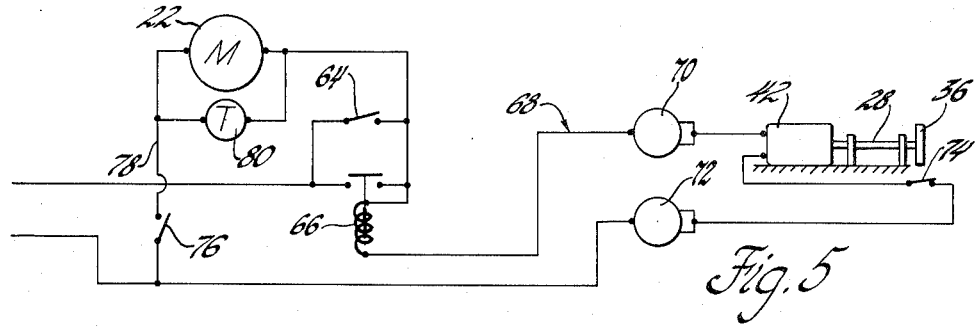
FIGURE 5 is a schematic diagram of control circuitry for the FIGURE 1 apparatus.

When a rupture of the specimen 28 occurs, it is desirable to have some arrangement for stopping the apparatus. For this purpose, the circuitry of FIGURE 5 is employed. This control circuitry utilizes, e.g., a 110 volt A.C. supply, and has a constant speed motor starting switch 64 so arranged that when closed a relay 66 will be energized so as to complete a constant speed motor circuit 68 extending from the source via appropriate slip rings 70 and 72 to the motor 42. An interrupter switch 74 is arranged in the circuit 68, preferably immediately below the disk 36 so that when the specimen ruptures and disk 36 drops down, the interrupter switch 74 will be opened and stop operation of the constant speed motor 42, thereby insuring that no damage to the apparatus can result.

The variable speed motor 22 is under the control of a starting switch 76, which switch controls a variable speed motor circut 78 also extending from the source. An electric timer 80 is arranged in parallel with the motor 22 and preferably times the test in minutes. Since the speed of the motor 42 is constant, the product of the test time in minutes, i.e., time required to rupture the specimen, and the r.p.m. of the motor 42 will furnish the exact number of cycles needed to produce a specimen rupture at the applied stress.

From the foregoing, it can be seen that by utilizing gyroscopic effect fatigue testing apparatus can, not only be caused to produce very accurate results, but also cause this to be done very effectively. By being capable of conveniently and easily increasing fiber stress, the specimen can be enlarged so as to avoid the variations in results produced by the lack of homogenous cross-sections, and the weight does not have to be as great; hence, the equipment can be smaller. Additionally, merely by altering the speed of the precession shaft 26, the moment applied can be varied over a substantial range, thereby negating the need to constantly change weights, this in itself affording a substantial saving in time.

The invention is to be limited only by the following claims:

1. The method of testing materials comprising the steps of rotatably supporting a specimen of the material to be tested between the ends thereof, applying a weight to the specimen at one end thereof so as to submit the specimen to a weight induced bending moment, revolving the specimen and the weight about one axis at a relatively fast constant speed so that the weight induced bending moment alternately places the fibers of the specimen in compression and tension, and revolving the specimen and weight simultaneously about another mutually perpendicular axis at a relatively slow speed so as to submit the specimen also to a supplemental bending moment produced by the gyroscopic effect from rotation about the another axis until the specimen is broken.

2. Apparatus for testing materials comprising support means for a test specimen of the material to be tested, a predetermined weight applied to the specimen, means revolving the specimen about one axis so as to apply an alternating bending moment induced by the weight to the specimen, and means revolving both the specimen and the weight about another axis mutually perpendicular to the one axis so as to apply a supplemental moment induced by gyroscopic effect to the specimen until the specimen is broken.

3. Apparatus for testing materials comprising support means for a test specimen of the material to be tested, a predetermined weight applied to the specimen, means revolving the specimen about one axis so as to apply an alternating bending moment induced by the weight to the specimen, and means revolving both the weight and the specimen about another axis having a predetermined nonparallel, nonconcentric angular relationship to the one axis so as to apply a supplemental alternating bending moment produced by gyroscopic effect to the specimen until the specimen is broken.

4. Apparatus for testing material comprising support means for a test specimen of the material to be tested, a predetermined weight applied to the specimen, means revolving the specimen about one axis so as to apply an alternating bending moment induced by the weight to the specimen, means revolving both the weight and the specimen about another axis having a predetermined nonparallel, nonconcentric angular relationship to the one axis so as to apply a supplemental alternating bending moment produced by gyroscopic effect to the specimen until the specimen is broken, and means interrupting operation of the apparatus when the specimen breaks.

5. Apparatus for testing materials comprising support means for a specimen of the material to be tested, a predetermined weight applied to the specimen, means revolving the specimen about an axis thereof, and means revolving the support means about an axis having a predetermined nonparallel, nonconcentric angular relationship to the axis of the specimen, both revolving means causing to be applied to the specimen alternating and additive bending moments including a moment induced by the weight of the specimen and a supplemental moment induced by gyroscopic effect until the specimen is broken.

6. Apparatus for fatigue testing materials comprising a rotatable support, a specimen revolvably supported on the support, a predetermined weight applied to the specimen, a motor revolving the specimen about an axis thereof so as to apply to the specimen an alternating bending moment induced by the weight, and another motor revolving the support about an axis having a predetermined nonparallel, nonconcentric angular relationship to the axis of the specimen so as to apply to the specimen a supplemental alternating bending moment produced by gyroscopic effect until the specimen is broken.

7. Aparatus for fatigue testing materials comprising support means for a specimen of the material to be tested, a weight applied to one end of the specimen, means revolving both the specimen and the weight about one axis so as to apply an alternating bending moment induced by the weight to the specimen, and means revolving the support about an axis mutually perpendicular to said one axis so as to apply a supplemental alternating bending moment produced by gyroscopic effect to the specimen until broken.

8. Apparatus for fatigue testing materials comprising a base, a platform rotatably mounted on the base, a specimen of the material to be tested revolvably supported on the platform between the ends thereof, a weight applied to the specimen, a motor revolving both the specimen and weight about an axis thereof so as to apply an alternating bending moment induced by the weight to the specimen, and another motor revolving the platform about an axis having a predetermined nonparallel, nonconcentric angular relationship to the axis of the specimen and weight so as to apply a supplemental alternating bending moment induced by gyroscopic effect to the specimen until broken.

9. Apparatus for fatigue testing a specimen of a certain material comprising a base, a platform having the specimen revolvably supported thereon between the ends thereof, a weight applied to one end of the specimen, a precession shaft drive connected to the platform, a motor drive connected to the opposite end of the specimen for rotating both the weight and the specimen about one axis thereof so as to apply an alternating bending moment induced by the weight to the specimen, and another motor drive connected to the precession shaft so as to revolve the platform about an axis mutually perpendicular to said one axis so as to apply a supplemental alternating bending moment produced by gyroscopic effect to the specimen until broken.

10. Apparatus for fatigue testing a specimen of a certain material comprising a base, a platform having the specimen revolvably supported thereon between the ends thereof, a disk-like weight joined to one end of the specimen, a constant speed motor attached to the other end of the specimen for revolving both the specimen and the weight about one axis thereof so as to apply an alternating bending moment induced by the weight to the specimen, a precession shaft drive connected to the platform and having the rotational axis thereof mutually perpendicular to said one axis, another motor drive connected to the precession shaft for revolving the platform so as to apply to the specimen until broken a supplemental alternating bending moment produced by gyroscopic effect, and switch means interrupting the operation of the apparatus when the specimen breaks.

11. The method of testing materials comprising applying a mass induced alternating bending moment to a rotatably supported specimen to be tested by rotating the specimen about one axis thereof with a weight of a certain mass affixed to the free end thereof and applying simultaneously a gyroscopic supplemental alternating bending moment to the specimen by rotating the specimen and the weight about another axis having a predetermined nonparallel, nonconcentric angular relationship to the one axis until the specimen is broken.

12. The method of testing materials comprising rotatably supporting a specimen of material to be tested for rotation about plural axes having a predetermined nonparallel, nonconcentric angular relationship to each other, applying a predetermined weight to the specimen so as to submit the specimen to a weight induced bending moment and revolving the specimen and the weight simultaneously about the plural axes so as to also submit the specimen to a supplemental bending moment produced by the gyroscopic effect from the rotation about the plural axes until broken.

13. The method of testing materials comprising the steps of rotatably supporting a specimen of the material to be tested, applying a predetermined weight to the specimen so as to submit the specimen to a weight induced bending moment, revolving the specimen and the weight about one axis so that the weight induced bending moment alternately places the fibers of the specimen in compression and tension, and revolving the specimen and the weight simultaneously about another axis having a predetermined nonparallel, nonconcentric angular relationship to the one axis so as to submit the specimen also to a supplemental bending moment produced by the gyroscopic effect from rotation about the another axis until the specimen is broken.

14. The method of testing materials comprising the steps of rotatably mounting a specimen to be tested between the ends thereof on a rotatable platform with one of the ends of the specimen drive connected to a motor, securing a weighted disk to the other end of the specimen, revolving both the specimen and the weight at a relatively fast speed about one axis thereof so as to submit the specimen to a weight induced alternating bending moment, and revolving the platform simultaneously at a relatively slow speed so that the specimen is revolved about another axis having a predetermined nonparallel, nonconcentric angular relationship to the one axis thereby submitting the specimen also to a supplemental gyroscopic effect until the specimen is broken.

References Cited by the Examiner
UNITED STATES PATENTS

| | | | |
|---|---|---|---|
| 443,695 | 12/1890 | Copeland | 73—6 |
| 2,135,839 | 11/1938 | Persons | 233—25 |
| 2,222,266 | 11/1940 | Rubissow | 18—26 |
| 2,435,772 | 2/1948 | Clarke | 73—100 |
| 2,624,072 | 1/1953 | Delacoste et al. | 18—26 |
| 2,761,314 | 9/1956 | Vernier | 73—134 |

FOREIGN PATENTS 530,418    12/1940    Great Britain.

LOUIS R. PRINCE, *Primary Examiner.*

C. A. CUTTING, DAVID SCHONBERG, RICHARD QUEISSER, *Examiners.*